May 8, 1962 J. B. MONIN 3,033,281
WINDSHIELD SLEET AND SNOW-PROTECTOR DEVICES
Filed May 29, 1961
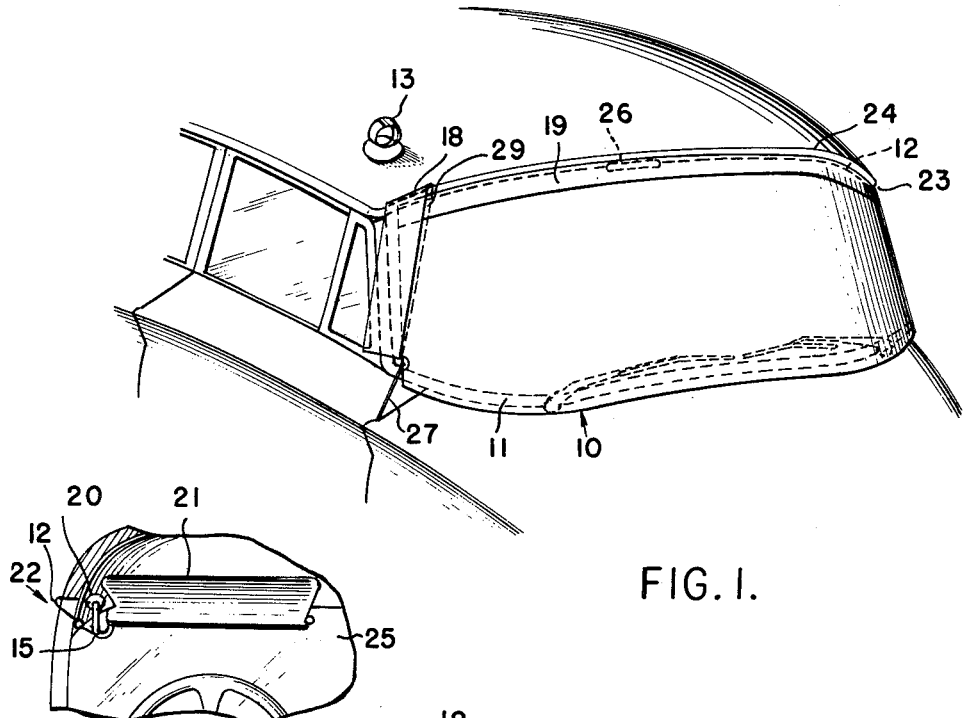
FIG. 1.
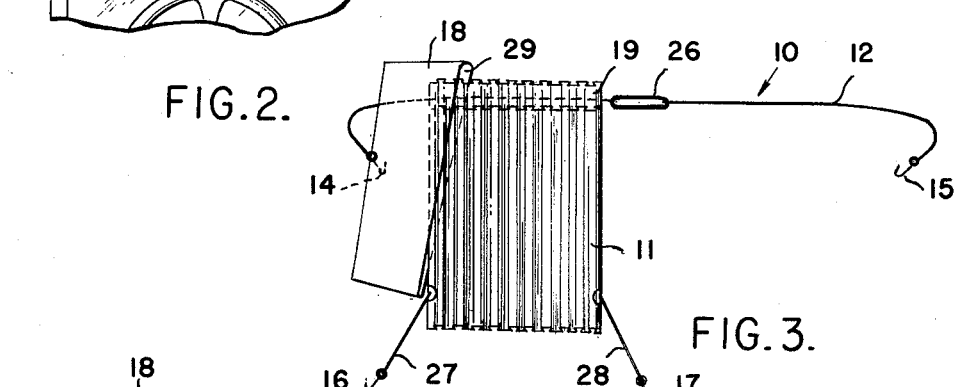
FIG. 2.
FIG. 3.
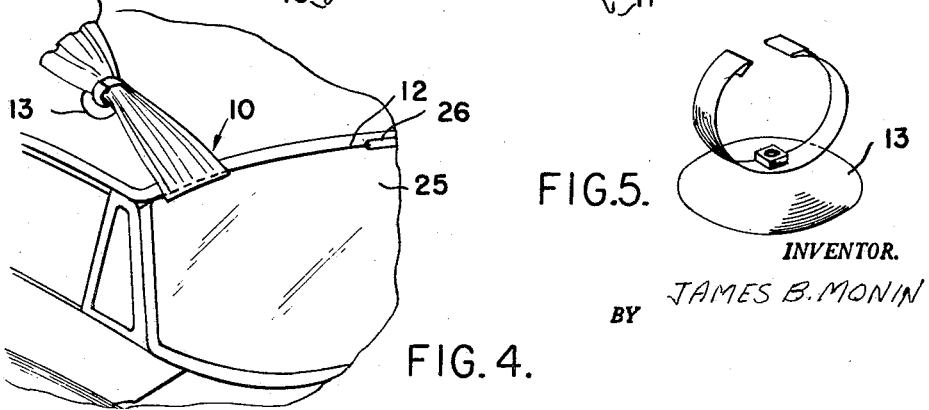
FIG. 5.
FIG. 4.
INVENTOR.
JAMES B. MONIN
BY United States Patent Office 3,033,281
Patented May 8, 1962

3,033,281
WINDSHIELD SLEET AND SNOW
PROTECTOR DEVICES
James B. Monin, 7725 Barrie, Dearborn, Mich.
Filed May 29, 1961, Ser. No. 113,282
4 Claims. (Cl. 160—19)

This invention relates to windshield protector devices adapted for use on automotive vehicles, especially those that are left outside during the night and exposed to inclement weather conditions.

The object of my invention is to provide a simple, durable, and economical in construction windshield protector of such a design that it may be easily mounted onto a windshield of an automotive vehicle and thereby provide complete protection against the accumulation of sleet and snow or any other obstruction of visibility created by bad weather conditions.

Still another object of my invention is to provide a windshield protector of such construction that it may be easily carried by a windshield in a folded condition, when not in use, in a position away from the area of visibility necessary for driving.

Still another object of my invention is to provide all the necessary means for attaching said windshield protector including a ring bracket and its associated suction cup, for facilitating easy securement of said windshield protector and its associated pocket to the roof of said vehicle.

Other objects and advantages of my invention will become more fully apparent from a consideration of the following description taken in connection with the accompanying drawings illustrating its embodiment, in which:

FIGURE 1 is a front end view in perspective of an automotive vehicle shown as being equipped with my windshield protector, FIGURE 2 is a fragmentary detail showing a portion of the interior of a vehicle to disclose a sun-visor to which said windshield sleet and snow protector is being attached by means carried thereby, FIGURE 3 is a view in elevation of a windshield sleet and snow protector showing the fabric or material from which it is constructed as being slidably moved on its attaching cord into its retaining pocket, FIGURE 4 is a fragmentary detail showing my windshield snow and sleet protector secured to the roof of a vehicle, and FIGURE 5 is an enlarged view in perspective of my expansive ring-bracket and its associated suction cup.

Referring specifically to the drawings wherein like reference characters designate like or similar parts, the windshield snow and sleet protector 10 consists of a flexible material 11 to which moisture is non-adherent, a cord 12, an expansive ring-bracket 13, hooks 14, 15, 16 and 17, respectively, and a pocket 18.

Reverting to the drawings, particularly to FIGURE 1, the flexible material 11 is in the formation of an apron having on its upper edge a hem 19 for threading therethrough a cord 12. Said cord 12 is provided at its terminals with two hooks 14 and 15 for being connected thereby to the convenient portions of the brackets 20 of the sun-visors 21 disposed internally and above said windshield within said vehicle, as shown at 22 in FIGURE 2.

For the purpose of rigid assembly, said cord 12 is accommodated within the rain channel 23 generally formed by the molding 24 over the windshield 25, as illustrated in FIGURE 1, and, in order to facilitate an easy assembly of said cord 12 to windshields having various dimensions in length, said cord 12 has the intermediate portion thereof provided with an elastic band 26 to enable the hooks 14 and 15 to reach their designated points of attachability.

As shown in FIGURES 1 and 3, the hook members 16 and 17 are carried on elastic straps 27 and 28, respectively, which are connected to both sides of the lower portion of said apron 11 for the purpose of stretching said apron tautly over the entire windshield area. Said hooks may be connected to any convenient projection along the crevice formed when the front doors from both sides of said vehicle are opened, and secured therein when said doors are closed.

It will be realized that said cord 12 may be permanently mounted within the drain channel 23 of said molding 24 thus making the windshield sleet and snow protector available for use at all times.

In order to dispose of the windshield protector from the area of required visibility for driving when the use of said device is not required, the pocket 18, being carried by the cord 12 adjacent said apron 11, has a longitudinal opening 29 for folding said apron 11 and the hooks 16 and 17 thereof thereinto when said apron is slidably moved into a pleated-like condition along said cord 12, as shown in FIGURE 3.

It will be realized that when said windshield protector 10 is in use the pocket 18 is supported in a suspended position on said cord 12 alongside said apron 11, as shown in FIGURE 1, and that when said windshield protector is not in use said pocket 18, having said apron 11 enclosed within its receptive mouth 29, is flapped over the roof of the vehicle, as shown in FIGURE 4, and secured thereto by an expansive ring-bracket of a suction cup 13 which is carried by the roof of said vehicle adjacent the upper terminal of the longitudinal edge of said windshield 25.

Various other changes and modifications are herein contemplated and may be resorted to provided however that such changes and variations will fall within the scope and spirit of the appended claims, in which I claim:

1. A device of the class described comprising a flexible housing of pocket-like formation having a cord passing through its upper extremity supporting said pocket in a suspended position over the windshield of a vehicle, a flexible material for covering said windshield for the prevention of the accumulation of sleet, snow and the like thereon being housed within said pocket, said flexible material having a hem of restricted width and having said cord threaded therethrough, said hem extending through the entire length of said flexible material and being in parallelism to the upper edge of said windshield when said material is stretched out over said windshield, means carried by said cord to regulate its length to a desired dimension when attachment thereof is effected to its required position, means carried by the terminals of said cord for attaching said cord thereby in a tense horizontal position to the windshield to the brackets of the sun-visors of a vehicle, means being carried by said material for stretching said material thereby in a taut condition over the entire area of the windshield, and an expansive ring-bracket for securing said pocket thereby in a swung-over position against the roof of said vehicle, said expansive ring-bracket being secured to the roof of said vehicle by a suction cup carried by said expansive ring-bracket.

2. As in claim 1 in which, said first means comprising an elastic band being carried by said cord and being an integral part thereof.

3. As in claim 1 in which, said second means comprising a pair of hooks attached to the terminals of said cord, 4. As in claim 1 in which, said third means comprising a pair of hooks having elastic leaders of restricted dimension in length for being secured thereby to both sides of the flexible material for maintaining said material in a taut condition over the entire area of said windshield.

References Cited in the file of this patent
UNITED STATES PATENTS

| | | |
|---|---|---|
| 1,517,455 | Priesthoff | Dec. 2, 1924 |
| 1,732,447 | Crane | Oct. 22, 1929 |
| 2,614,630 | Moszelt | Oct. 21, 1952 |
| 2,907,384 | Spratt et al. | Oct. 6, 1959 |